US012705310B2

(12) United States Patent
Streichert et al.

(10) Patent No.: US 12,705,310 B2
(45) Date of Patent: Aug. 11, 2026

(54) MACHINE LEARNING METHOD FOR ANOMALY DETECTION IN AN ELECTRICAL SYSTEM

(71) Applicant: Festo SE & Co. KG, Esslingen (DE)

(72) Inventors: Thilo Streichert, Stuttgart (DE); Silvia Starz, Weinstadt (DE)

(73) Assignee: Festo SE & Co. KG, Esslingen (DE)

( * ) Notice: Subject to any disclaimer, the term of this patent is extended or adjusted under 35 U.S.C. 154(b) by 865 days.

(21) Appl. No.: 17/932,719

(22) Filed: Sep. 16, 2022

(65) Prior Publication Data

US 2023/0115878 A1 Apr. 13, 2023

(30) Foreign Application Priority Data

Sep. 20, 2021 (DE) ........................ 102021124253.3

(51) Int. Cl.
*G06F 18/2433* (2023.01)
*G06F 18/10* (2023.01)
(Continued)

(52) U.S. Cl.
CPC .......... *G06F 18/2433* (2023.01); *G06F 18/10* (2023.01); *G06F 18/211* (2023.01); *G06F 18/2413* (2023.01)

(58) Field of Classification Search
CPC .... G06F 18/2433; G06F 18/211; G06F 18/10; G06F 18/2413; G06N 20/00
See application file for complete search history.

(56) References Cited

U.S. PATENT DOCUMENTS 5,555,888 A * 9/1996 Brewer ................ A61N 1/3702 600/515
2010/0023307 A1 1/2010 Lee
(Continued)

FOREIGN PATENT DOCUMENTS

| DE | 102012015485 | 5/2014 |
|---|---|---|
| DE | 102020202870 | 9/2021 |
| EP | 1777601 | 4/2007 |

OTHER PUBLICATIONS

Tax, David Martinus Johannes: One-class classification; concept-learning in the absence of counter-examples. Delft, NL : Technische Universiteit Delft, 2001.—ISBN 90-75691-05-X.
(Continued)

*Primary Examiner* — Eric Nilsson
(74) *Attorney, Agent, or Firm* — SLEMAN & LUND LLP

(57) ABSTRACT

Continuous condition monitoring of an electrical system, and in particular for early fault detection, is provided. The condition monitoring unit is formed with an interface to a memory in which a trained normal state model is stored as a one-class model that has been trained in a training phase with normal state data and represents a normal state of the electrical system. Further, the condition monitoring unit comprises a data interface for continuously acquiring sensor data of the electrical system by means of a set of sensors, an extractor for extracting features from the acquired sensor data, a differentiator for determining deviations of the extracted features from learned features of the normal state model by means of a distance metric (e.g., Euclidean norm, sum norm, maximum norm), a scoring for calculating an anomaly score from the determined deviations, and an output unit for outputting the calculated anomaly score.

16 Claims, 6 Drawing Sheets

(51) Int. Cl.

| | |
|---|---|
| ***G06F 18/211*** | (2023.01) |
| ***G06F 18/2413*** | (2023.01) |

(56) References Cited

U.S. PATENT DOCUMENTS

| | | | | |
|---|---|---|---|---|
| 2010/0114806 | A1 | 5/2010 | Harrison | |
| 2016/0342903 | A1* | 11/2016 | Shumpert | G06F 11/008 |
| 2020/0137078 | A1* | 4/2020 | Tewari | H04L 63/101 |
| 2020/0210393 | A1* | 7/2020 | Beaver | G06F 16/2474 |
| 2021/0326759 | A1* | 10/2021 | Ardel | G05B 23/0254 |

OTHER PUBLICATIONS

Ruff, L., Vandermeulen, R., Goernitz, N., Deecke, L., Siddiqui, S.A., Binder, A., Müller; Kloft, M.. (2018). Deep one-Class classification. Proceedings of the 35th International Conference on Machine Learning, in Proceedings of Machine Learning Research 80:4393-4402.

* cited by examiner

C3 anomaly score distance

MACHINE LEARNING METHOD FOR ANOMALY DETECTION IN AN ELECTRICAL SYSTEM

The present invention is in the field of condition monitoring and fault detection of technical systems. In particular, the invention relates to a method and system for continuous condition monitoring and anomaly detection in an electrical system.

Anomalies in an electrical system jeopardize its proper functioning. Reliable condition monitoring of the electrical system is essential in order to be able to react quickly in the event of anomalies and to restore the system to its proper operating condition. In this context, the quality of condition monitoring strongly depends on its parameterization. Typically, anomaly behavior differs from electrical system to electrical system and cannot be easily predicted. Often, anomalies are only detected during routine maintenance work and reactively repaired or noticed due to a machine shutdown.

On this basis, the present application is based on the task of creating an approach that is available to operators of an electrical system for diagnosing anomalies.

This task is solved by a method for continuous condition monitoring, a condition monitoring unit and by a computer program for carrying out the condition monitoring. Further advantageous embodiments of the invention with advantageous features can be found in the following description.

According to a first aspect, the task is solved by a method for continuous condition monitoring of an electrical system, in particular for anomaly detection. The method comprises the following method steps, which are executed in an inference phase:

- Providing a trained normal state model as a one-class model that has been trained in a training phase with normal state data representing a normal state of the electrical system;
- Continuous acquisition of sensor data of the electrical system by means of a set of sensors;
- Extracting features from the acquired sensor data;
- Determining deviations of extracted features from learned features of the normal state model using a distance metric (e.g., Euclidean norm, sum norm, maximum norm);
- Calculating an anomaly score from the determined deviations and
- Output of the calculated anomaly score.

This computer-implemented procedure can be used as a diagnostic system and is executed in the background, so that operators only need to react in the event of anomalies in order to initiate appropriate means of troubleshooting. In particular, the approach is based on identifying features based on sensor data, which are used to train a normal state model that can be used to evaluate future states of the electrical system. The higher the deviation of the features determined in the subsequent operating mode from those of the trained normal state, the greater the probability of a fault condition. This is translated into an anomaly score so that the operator of the electrical system can react accordingly.

The terminology of the invention is explained in more detail below.

The normal state model describes the normal state of the electrical system. In the normal state, there are no anomalies and here there is proper functioning of the production process. By "production process" is meant the repetition of production cycles, thus the operating state of the electrical system. A cycle or a production cycle in this context describes the movement of an electrical actuator or the movement of a component caused by an electrical actuator back to its starting point. An electric actuator is, for example, an electric motor. The movement is, for example, a linear displacement of a cylinder piston, a movement of a slide or a rotary movement of an actuator.

An electrical system may have more than one operating state. For example, an electrical system may be operated at different voltage levels, with each voltage level characterizing an operating state. In this case, for each operating state, the normal state of the electrical system must be learned during the training phase.

The normal state can be represented by characteristics of the electrical system. These features are based on measured state data of the normal state, such as current strength, voltage strength, or time stamp. The One-Class model learns these features and defines the normal state based on them. For learning the normal state, the measured normal state data from several entire production cycles is ideally used during training.

For example, an electrical system may be a single electrical actuator or a plurality of actuators. The plurality of actuators may be operated independently of each other. In some applications, the plurality of actuators may also be operated such that they have points of contact or are operated dependent on each other or dependent on a common component. For example, one or more gears may be in communication with one or more actuators and/or axes.

Another example of an electric actuator is a gripper, another example is an electric slide. The latter can be characterized by features. Features may include, for example, the speed and/or acceleration of the sled (carriage). The sled may also be characterized by an acoustic profile, where the acoustic profile is indicative of a production cycle. In this case, the speed and acceleration of the sled, as well as the acoustic profile, are not measured directly, but are extracted based on easily accessible state data. A production cycle of the sled/carriage consists of its acceleration and movement to a position and the reverse acceleration and movement back to its starting point. The associated velocities and accelerations, as well as the length of the production cycle, can be assigned a numerical value in the normal state. Deviations from this can indicate an anomaly.

If anomalies are present, the electrical system cannot operate in the normal state. The efficiency may be significantly lower than the rated or nominal efficiency. Anomalies can cause delays, energy losses, productivity disturbances, failure of electrical system components, production stoppage or similar. Anomalies can be caused by bearing damage, wear, capacitor damage, contamination, heat generation, and/or increased friction in the system.

In a preferred embodiment of the invention, the normal state model is a statistical model and/or machine learning model.

In a statistical model, probabilities are assumed for the characteristics of the normal state, whereby the probabilities can be based on empirical values and/or modeling. The characteristics of the normal state are predefined. The parameterization of the characteristics can be adjusted when a new event occurs. A new event is, for example, the connection of a new element, e.g. actuator, to the existing electrical system or the removal of an element, e.g. actuator, from the electrical system.

A machine learning model generates a statistical normal state model based on training data. In the process, the learning model determines the features that characterize the normal state itself. In an iterative manner, a normal state model is generated, an error probability quantifying the deviation of the normal state model is estimated, and the model is optimized until, for example, the error probability no longer improves noticeably. A machine learning model can be trained using deep learning and/or neural networks.

In this context, the term "one-class model" refers to a state model that is generated only from data of the normal state. The features of the normal state specified in the statistical model are quantified (learned features) and it is determined within which deviations state data can still be attributed to the normal state.

During training, the machine learning model generates features from the state data of the normal state and learns their characteristics. As a "one-class model", the learning model is only trained with state data of the normal state and distinguishes in the production process between state data relating to the normal state and to state data relating to an undetermined remainder (anomaly). Unlike other machine learning models, no appropriately labeled counterexamples of the normal state are used for training. This has the advantage that no data representing the state with anomalies is needed for training. Such state data with anomalies are often not yet available when an electrical system is commissioned.

The goal of training is for the model to learn to accurately identify the normal state of the electrical system in order to delineate deviations from it as an anomaly in the production process. In this process, an objective function is optimized so that the machine learning model accepts as much state data of the normal state as possible and as little data of a state with anomalies as possible. In the production process, one metric specifies the distance of the state data from the normal state model, or a probability that the state data belongs to the normal state. Another metric is a threshold on this distance or probability. State data is accepted as belonging to the normal state if it is below the threshold.

David Tax discusses different methods and their advantages and disadvantages of one-class models (TAX David Martinus Johannes, One-class Classification: Concept-learning in the Absence of Counter-examples. Technische Universiteit Delft: Dissertation, 2001, ISBN: 90-75691-05-x). According to this, the one-class model can be implemented using, for example, one or more of the following methods:

- Density estimation, which estimates the density of the normal state data and sets a limit on the density distribution. The limit value can be based on a certain distribution (e.g. Poisson or Gaussian distribution). State data that fall outside the limit are classified as not belonging to the normal state;
- Boundary method, which fits the smallest possible volume around the data of the normal state that best characterizes the features of the normal state. The boundary value can be derived directly from the outer area of the volume. An example of the boundary method is the support vector data description ("SVDD"), which uses the smallest possible hypersphere to separate the normal state data from the error state data. The boundary method is described in more detail in e.g. Ruff, L., Vandermeulen, R., Goernitz, N., Deecke, L., Siddiqui, S. A., Binder, A., Müller; Kloft, M. (2018). Deep one-class classification. Proceedings of the 35th International Conference on Machine Learning, in Proceedings of Machine Learning Research 80:4393-4402 Available from http://proceedings.mlr.press/v80/ruff18a.html. Other volumes, such as that of a bounding box, can also be used;
- Reconstruction method, which makes assumptions about the clustering properties of the normal state data and their distribution in subspaces. It is assumed that the state data of an anomaly state does not satisfy the assumptions. An example of the reconstruction method is the k-means method. Here, the normal state data are grouped by features, with each group represented by a "prototype" in the form of a center. If the state data deviates too much from the nearest center, the state is classified as not belonging to the normal state.

In another embodiment, the model can be trained with state data of the normal state and mixed state data containing both normal state data and fault data. For this purpose, the methods "Isolation Forest" or "One-Class-Support-Vector-Machines" can be considered, for example.

Sensor data may be collected by sensors within the electrical system and/or on the electrical system and quantify typical measured variables of an electrical system. For example, one or more of the following sensors may be used:

- Voltmeter;
- Ammeter (current meter);
- Temperature sensor;
- Speed controller;
- Capture a timestamp;
- Proximity sensor that measures the position of an actuator of the electrical system;
- Linear variable differential transformer ("LVDT") for displacement measurement of an actuator;
- Limit position switch for detecting when the actuator reaches a certain position;
- Microphone; and/or
- Structure-borne sound pickup.

In the inference phase, the process steps described above are carried out. The inference phase, or several inference phases, can run continuously in the operating state of the electrical system. Alternatively or additionally, the inference phase can also be called only at certain times, for example after an interruption of the operating state.

The extraction of features includes, among other things, the translation of the pure measurement points into interpretable, physical quantities. For example, a duration for a certain process, an acceleration and/or a speed of a carriage can be extracted from two measured time stamps. However, it may not always be necessary to extract features. In some cases, the sensor data can also be used directly for the next step of the process, namely: determining the deviations of the extracted features from learned features of the normal state model using a distance metric. In some cases, features only need to be extracted from certain sensor data. It may also be that feature extraction involves logical, comparative, and/or arithmetic operations. The features may be n-dimensional vectors.

A distance metric quantifies how far away the extracted features are from the learned features. Typical distance metrics are the Euclidean norm, sum norm or also the maximum norm. The weights of the distance metrics and/or a combination of distance metrics can also be used.

The anomaly score calculated from the distance metric is output so that an electrical system operator or even a control system can take appropriate actions in the event of anomalies. The anomaly score can be output in a variety of ways. For example, an operator may receive push messages, mails, or other messages. The output can be visual in the form of a graph and/or a quantified value.

The anomaly score gives a probability-based statement about the state of a part and/or the entirety of the electrical system. For example, a specific anomaly score can be calculated for a specific actuator. However, a specific anomaly score can also be calculated for an example unit from a transmission with multiple axes and motors. In some cases, "zero" may mean that the electrical system is operating in a normal state, i.e., fault-free. The higher the anomaly score, the greater the deviation from the learned normal state of the electrical system can be. The anomaly score can serve as an early warning system, which already shows small deviations from the normal state.

Furthermore, the algorithm for calculating the anomaly score can be parameterized. Thus, for example, the sensitivity of the anomaly score and the training and smoothing interval used to calculate the anomaly score can be set depending on the application. In some cases, the anomaly score can be output as a continuous signal over time. This may be particularly useful for trend detection. The anomaly score can also be output as a discrete signal, for example in the form of a dashboard with mean values, intermediate results, statistical parameters, training data and/or state data.

In another preferred embodiment of the invention, the calculated and output anomaly score is used to detect anomalies of the electrical system. Furthermore, the normal state data may comprise a current strength and/or a torque of a motor, a position, velocity and/or acceleration of an actuator (e.g. carriage), microphone/body sound measurements, force measurements and/or analog and/or digital measurement signals of electrical components, in particular cylinders. The terms "measurement signals" and "sensor data" are used interchangeably herein.

In a first embodiment, the method may be used reactively, for example as part of a controller in the production process, thus providing feedback to the production process. For example, the method may be implemented in a programmable logic controller (PLC). In a second embodiment of the invention, the method may be used as a recommendation system without effecting a direct feedback on the process and serving only for the early detection of anomalies and the issuance of warnings and/or recommendations. The method may also be designed as a recommendation system with a feedback on the process.

Advantageously, the procedure described above can be executed directly in a fieldbus node and/or an edge device. In addition, part of the process or the entire process can be executed on a central computer architecture and/or in a cloud. The procedure can be made available in a persistent storage so that it can be executed even after a power failure or other interruption. For multiple actuators connected to a fieldbus node, if the normal state models of the actuators differ, the corresponding number of specific normal state models can be made available in the fieldbus node.

In a further, advantageous embodiment of the invention, the anomaly score can be forwarded to selected other network nodes via a TCP/IP-based network protocol, in particular via an MQTT protocol or an OPC UA protocol. For this purpose, a broker node can be set up on a fieldbus node of the electrical system, which acts as an intermediary to send the calculated anomaly score from a monitoring unit executing the anomaly detection procedure to the selected network nodes. Alternatively or in addition, the anomaly score and/or state data can be forwarded to a programmable logic controller (PLC) and/or a smart device (e.g. tablet) and/or a cloud.

Advantageously, a productivity score can be determined, especially if process cycles are automatically detected, in order to evaluate how a cycle duration develops over a longer time horizon. If an increase in cycle duration occurs and productivity thus decreases, a productivity warning message can be issued, e.g. to warn the operator of the electrical machine or plant.

In a further embodiment of the invention, the representation or modeling of the normal state can be done via a bounding-box method or by means of a k-means method or via another suitable one-class-learning method. The bounding-box method is based on the bounding method described above. Instead of a hypersphere, an n-dimensional box is trained here, which serves as a boundary in the production process for data that deviates from the normal state. The n-dimensional box is fitted around the data of the normal state in such a way that its volume is as small as possible, while the normal state is represented as best as possible.

Other one-class-learning methods of the boundary method are, for example, the nearest-neighbor method or the k-center method.

With the k-means method or k-means clustering, the features of the normal state are grouped into subspaces. Each subspace can be represented by a prototype or center such that the variances between the center and the normal state data are minimal. Other one-class-learning reconstruction methods include the learning-vector-quantization method and the self-organizing-map method.

In a further, advantageous embodiment of the invention, a normalization function may be applied to the determined deviations. The result of this can be the anomaly score. This serves in particular to improve further processing of the anomaly score, for example by an operator and/or a control system. In particular, a sigmoid function (e.g. logistic function) can be used as normalization function. The inflection point (turn point) and/or a slope (gradient) of the sigmoid function can be parameterized and/or the sigmoid function can be linearly rescaled in the training phase so that a graphical representation of the anomaly score is continuous. Ideally, this can result in the anomaly score passing through the coordinate origin, so that a function value of "zero" is output for the anomaly score, in particular for a distance value of "zero", and can thus be interpreted particularly well. In a preferred embodiment of the invention, it may be provided that in order to determine the parameterization of the sigmoid function (inflection point and/or slope), a statistic on the distances of the training data points to the learned normal state is calculated. This may be performed as the final step of the training process.

Furthermore, it can be provided that when a configurable threshold value of the anomaly score is exceeded, the operator of the electrical system is alerted. This can happen, for example, by means of a warning message (e.g., to a mobile terminal). In addition, the anomaly score values can be assigned traffic light colors via configurable threshold values. For example, it can be specified that when the anomaly score threshold value of 0.3 is exceeded, a traffic light jumps from green to yellow. A traffic light representation with the following semantics is also conceivable: Normal condition, Functional check recommended, Maintenance recommended, Maintenance required, Warning to user when color changes. Other visualizations and/or soundings of the anomaly score when it exceeds a certain value can also be implemented.

The anomaly score can be output globally for an entire electrical system. Alternatively or in addition, the anomaly score can also be output locally for certain subgroups and/or functional units of an electrical system, such as a transmission with multiple actuators and axes, in order to simplify the localization of the anomaly. In this case, a large number of sensor signals from different sensors are processed, which is advantageous for the efficiency and scalability of anomaly detection and rectification.

Various problems and their remedies can be considered for the manually and/or automatically executed troubleshooting. If a faulty anomaly score is displayed although no fault can be detected in the electrical system, the one-class model may have been trained with state data of the transient phase (or startup phase) instead of state data of the normal state, which may deviate from the normal state. In this case, retraining the one-class model after the transient phase has been completed, may be recommended. Alternatively or in addition, the training data might not fully represent the normal state, for example due to multiple operating states. In this case, retraining the One-class model with an extended interval that includes all operating states may be recommended. Post-training with missing operating states is also possible.

If a low anomaly score is displayed although anomalies are present in the electrical system, the training data may contain a statistically relevant error component. In this case, it is recommended to retrain the one-class model with normal state data without fault cases or with a statistically irrelevant fault case component.

Furthermore, the sensitivity of the anomaly score may not achieve the desired results. In this case, the parameterization of the anomaly score should be readjusted and/or the smoothing interval should be adjusted, if it is due to the long-term short-time setting.

Troubleshooting can be performed using the state data or completely based on the state data. In a preferred embodiment, the method can be controlled via meta-parameters. The meta-parameters can represent a parameterization of the model and in particular include a determination of the number of k-means centers and/or a number of bounding boxes, and/or a calculation rule for the boundaries of the bounding boxes, and/or a weighting of extracted features and/or further parameters for feature extraction.

In another preferred embodiment of the invention, the meta-parameters may include a parameterization of the sensors and thus determine, for example, which sensor data is to be acquired, when and/or how often the sensor data is to be acquired, and/or specify the cycle length. Furthermore, the meta-parameters may provide a parameterization of the distance metric, a parameterization of the anomaly score calculation, and/or a parameterization of the output. In addition or alternatively, a method may be provided to determine the meta-parameters inversely from the measurement signals. In an advantageous embodiment of the invention, all or parts of the aforementioned determinations may optionally be acquired via appropriately provided fields on a user interface.

Advantageously, the training data in the training phase and the productive data—and especially the sensor data—in the inference phase are preprocessed using the same preprocessing methods (e.g. normalization). This serves the comparability of the data. If, for example, time windows for feature extrusion are determined by automatic pattern recognition, this can be done in the same way in the training and inference phases.

The preprocessing methods may include running a pattern recognition algorithm on the sensor data and/or on the normal state data. This may be used to detect recurring patterns in the sensor data that represent process cycles. In this context, the detected process cycles can be used as parameterization of a time window. Further, in particular, a result of the pattern recognition algorithm can be used to calculate time windows in which feature extraction is performed. The time windows can be configured to be non-overlapping, i.e. consecutive, or overlapping. In particular, the time windows can be defined for certain phases in which features are to be extracted. If no feature extraction takes place, e.g. if the sensor information flows directly into the normal state model, a definition of the time windows is not necessary.

The time window length can be specified as a static value in the unit number of cycles or in time units, such as 10 seconds. If the cycles are detected automatically, the cycle length can also be dynamic. In this case, for example, the average value could be calculated as a characteristic for this time window length. Here, the time window length should not be confused with the training data set length. The training dataset can include a plurality of time windows in order to train a statistical model in a meaningful way. Features can then be extracted from the complete training data set. The training data set can again be divided into many time windows (non-overlapping or overlapping). The time windows can be determined, for example, by the electrical system operator via a menu based on experience or based on monitoring of measured data (cyclic process length). Alternatively or cumulatively, the time windows can be determined algorithmically by an automated detection of recurring patterns, for example by an auto-correlation. Further, a trial-and-error process may be used to determine or optimize the window selection and/or the selection of sensor data. The selection of sensor data may also be based on empirical values stored in a database or memory and read out for this purpose. The time window length can correspond to the cycle length or deviate from it. However, since automated (production) processes by electrical systems are usually cyclic processes, this is often useful.

Further, the pre-processing methods and in particular a pattern recognition algorithm may include auto-correlation.

The method described above may further comprise a dimensionality reduction method (e.g., principal component analysis, "PCA"), and the dimensionality reduction method may be applied to the raw data and/or to the extracted features, in particular, in a data preprocessing step.

The calculated anomaly score can preferably be subjected to a low-pass filter, whereby the low-pass filter can be parameterizable.

In a preferred embodiment of the invention, meta-parameters, in particular sensitivity parameters, can be recorded on an input field of a user interface, and the sensitivity parameters can characterize under which conditions, and in particular how fast, differences between the extracted features and the learned features are processed as deviations.

Advantageously, the extracted features can comprise statistical characteristics and in particular mean values, minima, maxima, differences, quantiles, in particular quartiles, skewness and/or kurtosis of the sensor data and/or their derivatives, characteristics of the frequency analysis (e.g. by Fourier analysis) or other selected characteristics over time.

Further, after the sensor data is acquired, the method may execute a pre-processing algorithm on the acquired sensor data that transforms the data into a different format and/or filters out outlier data.

Preferably, after acquiring the sensor data, the method may execute a pattern recognition algorithm to detect recurring patterns in the sensor data (e.g., by auto-correlation) that represent process cycles, and the acquired process cycles may be used as parameterization of a time window.

For example, a one-to-one assignment can be provided, which assigns the detected process cycle length to a time window for extracting the features. However, only certain subsections of the process cycles can be of interest, such as the clamping process in car body construction: A process cycle here comprises the clamping of the car body parts. This usually takes less than a second. The subsequent welding process takes about 30 seconds and the subsequent release again less than one second before the welded part is passed on to the next production step. The entire clamping process therefore also includes the 30-second welding period, which does not have to be taken into account in all cases during feature extraction.

The solution of the object was described above on the basis of the claimed method. Features, advantages or alternative embodiments mentioned therein are likewise to be applied to the other claimed subject matters and vice versa. In other words, the apparatus-based subject matter claims (which are directed, for example, to a condition monitoring unit or to a computer program) may also be further formed with the features described or claimed in connection with the method and vice versa. In this context, the corresponding functional features of the method are formed by corresponding representational modules, in particular by hardware modules or microprocessor modules, of the system or product, and vice versa. The claimed apparatus is accordingly configured to carry out the above-described method. The advantageous embodiments of the invention of the method described above may also be implemented in the condition monitoring unit. These will not be repeated separately here.

According to a second aspect, the invention relates to a condition monitoring unit for continuous condition monitoring of an electrical system and, in particular, for early fault detection, wherein the condition monitoring unit is adapted to perform one of the methods described above, comprising:

- An interface to a memory in which a trained normal state model is stored as a one-class model that has been trained with normal state data in a training phase and represents a normal state of the electrical system;
- A data interface for continuously acquiring sensor data of the electrical system by means of a set of sensors;
- An extractor for extracting features from the acquired sensor data;
- A differentiator for determining deviations of extracted features from learned features of the normal state model using a distance metric (e.g., Euclidean norm, sum norm, maximum norm);
- A scoring unit for calculating an anomaly score from the determined deviations, and
- An output unit to output the calculated anomaly score.

According to a third aspect, the problem is solved by a computer program comprising instructions which, when the computer program is executed by a computer, cause the computer program to execute the method according to any of the method claims described above.

In the following detailed description of figures, examples of embodiments which are not to be understood restrictively are discussed with their features and further advantages on the basis of the drawings.

BRIEF DESCRIPTION OF THE FIGURES

FIG. 5 is a schematic representation of a normalization function according to the present invention.

DETAILED DESCRIPTION OF THE FIGURES

In the following, the invention is described in more detail by means of embodiment examples in connection with the figures.

The scope of protection of the present invention is given by the claims and is not limited by the features explained in the description or shown in the figures.

The present invention relates to a method and a device for monitoring the condition of electrical systems, in particular for detecting anomalies.

Figure 1:
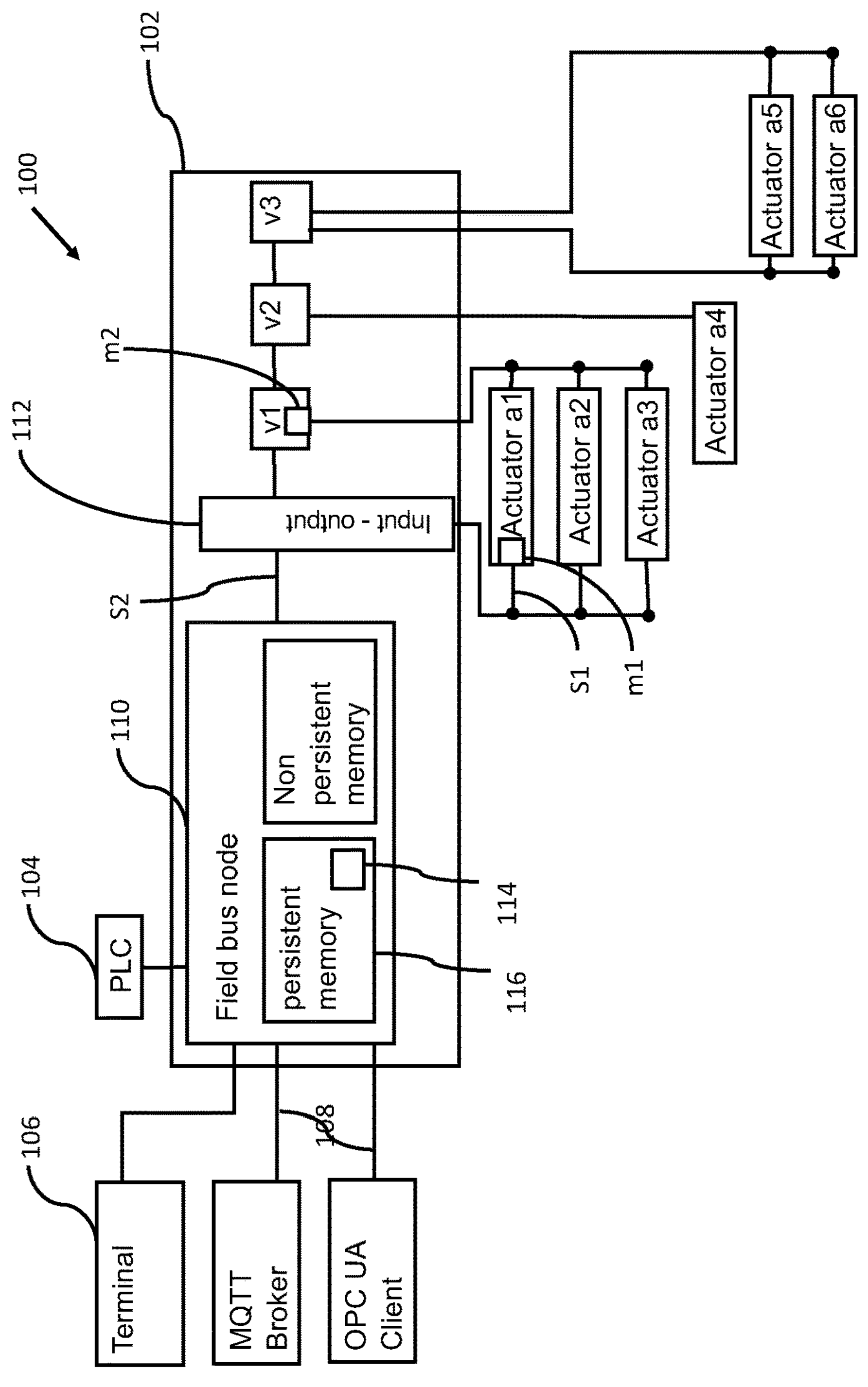
FIG. 1 shows a schematic representation of a part of an electrical system, in particular a unit with a plurality of actuators.

FIG. 1 shows an overview diagram of an electrical system 100 having a condition monitoring 114. The electrical system 100 includes a unit 102 having a plurality of actuators $a_i$. It is conceivable that an electrical system 100 may include other or differently connected or more of these actuators $a_i$. Other components of the electrical system 100 include, but are not limited to, the controller 104, a terminal 106, and communication interfaces 108. The communication interfaces 108 may include an interface to a memory 110, 116 in which a trained normal state model is stored as a one-class model, and a data interface 112, 302 for continuously acquiring sensor data.

The unit 102 includes power controls v1, v2, v3, which may be voltage controls, for example. In addition, a plurality of actuators a1, . . . , a6 are located on the unit 102. The actuators a1, . . . , a6 are connected to and controlled by, for example, the voltage controls v1, . . . , v3. For example, the actuator a1 can be a carriage. The controller v1 connected to it can activate the electric motor of the carriage by means of corresponding voltage signals, so that the carriage moves. Further, there is a digital input/output hub 112 on the unit 102, which is connected to the actuator a1 via the signal line s1. A signal line s2 connects the voltage control v1 to the hub 112. Corresponding signal lines lead from the actuators a2, . . . , a6 and the controls v2, . . . v3 to the hub for digital inputs and outputs 112. For the sake of clarity, their detailed description or illustration is omitted here. It should be noted that the signal lines s1, s2 are shown as lines. However, these can also be replaced in each case by wireless communication interfaces. Furthermore, the voltage control is only an example. The torque and/or the speed of the electric motors of the actuators can also be specified by the controls v1, . . . , v3.

The hub 112 of the unit 102 is further connected to a fieldbus node 110. The fieldbus node 110 represents the computing center of the unit 102 and includes the condition monitoring unit 114. The condition monitoring unit 114 may be made available in a persistent memory 116 (e.g., flash memory) of the fieldbus node 110. The condition monitoring unit 114 includes, for example, models and their parameters, training and inference algorithms, training data, state data, meta-parameters, and configuration parameters (not shown). In addition, the fieldbus node has non-persistent memory (e.g., RAM). Here, for example, historical state data and the associated anomaly scores can be stored.

The condition monitoring unit 114 receives sensor data via the hub 112 in the training state as well as during the inference or operating state of the electrical system 100. Exemplary sensor m1, for example a limit switch on the actuator a1, and a sensor m2 for sensing a timestamp on the controller v1 are shown. The sensor m1 measures, for example, the time at which the actuator a1 has reached a predetermined position. The sensor m2 measures, for example, the time at which the voltage control v1 was activated. From this sensor data, the monitoring unit in this example calculates an anomaly score using the one-class model described above. This can be communicated to other components and/or units of the electrical system via the communication interfaces 108 and/or displayed on the terminal 106.

The communication interfaces 108 may be, for example, communication interfaces of a distributed system, such as OPC Unified Architecture (OPC UA). This interface may be used to communicate with other fieldbus nodes and/or an IT data pool. In addition or alternatively, the communication interface can be designed as a machine-to-machine communication interface and serve, for example, to transmit messages via a Message Queuing Telemetry Transport (MQTT) protocol. This is shown in FIG. 1 with the reference sign MQTT Broker.

The fieldbus node 110 is further connected to a controller, such as a PLC 104, and a terminal 106. The terminal 106 may include a user interface for input by an operator. In addition or alternatively, the terminal 106 may serve to display the anomaly score provided by the condition monitoring unit 114.

In a preferred embodiment of the invention, the condition monitoring unit 114 comprises three interfaces, a first interface to the sensors m, a second interface to a memory 116 in which the trained one-class model is stored, and a third interface, which may be a human-machine interface 320 or a terminal 106 and is for inputting and outputting data. In a simple embodiment, the condition monitoring unit 114 may include the extractor 304, the differentiator 310, and the scoring unit 318. Of course, the memory 116 may also be formed as an internal memory so that the trained one-class model may be stored internally and locally in the fieldbus node 110.

Figure 2:
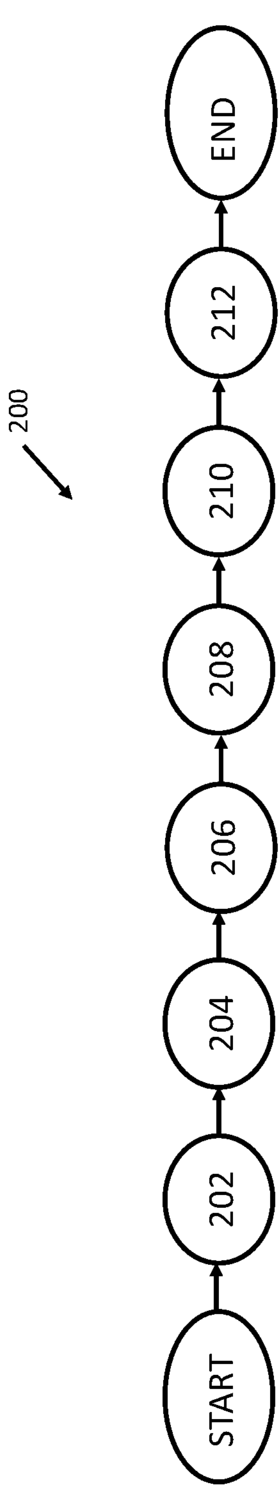
FIG. 2 is an example of a flow chart for a continuous condition monitoring process.

FIG. 2 is an example of a flowchart for a method 200 for continuous condition monitoring with steps 202-212 executed in an inference phase. The method 200 can run in the condition monitoring unit 114—hereinafter also referred to in short as: monitoring unit 114—of the electrical system 100, or the monitoring unit 114 can initiate the corresponding steps.

In a first step 202, a trained normal state model is provided. The normal state model was trained as a one-class model and with state data of the normal state of the electrical system 100. In the normal state, the electrical system 100 runs without errors. The normal state data represents this case. If the actuator a1 is a tensioner (clamping device), the normal state can be used to specify exactly how long it takes to complete a production cycle.

In a step 204, sensor data of the electrical system 100 is continuously acquired by means of a set of sensors. The set of sensors includes at least the sensors m1 and m2 described above. In addition, several of these or other types of sensors (microphones, structure-borne sound pickups) may collect sensor data.

Furthermore, in step 206, features are extracted from the continuously acquired sensor data. By extracting, physically interpretable quantities, the features, are derived from the pure measured data points. For example, measured time stamps are assigned the characteristic of a duration associated with a particular process.

This is followed by step 208, which determines the deviations of the extracted features from learned features of the normal state by means of a distance metric. The distance metric can be, for example, a Euclidean norm, a sum norm, or a maximum norm.

From these determined deviations, an anomaly score is calculated in step 210. This calculation is described in more detail in connection with FIG. 3.

The anomaly score is output at step 212. For example, the output may be provided via the electrical system terminal 106. The anomaly score may also be communicated exclusively or additionally to other participants via the communication interface 108. In addition or alternatively, the anomaly score may be communicated, for example, as a control variable to the control 104. This can adjust its manipulated variable if required. Furthermore, the anomaly score and the associated state data can be stored in the non-volatile memory 116 of the fieldbus node 110.

Figure 3:
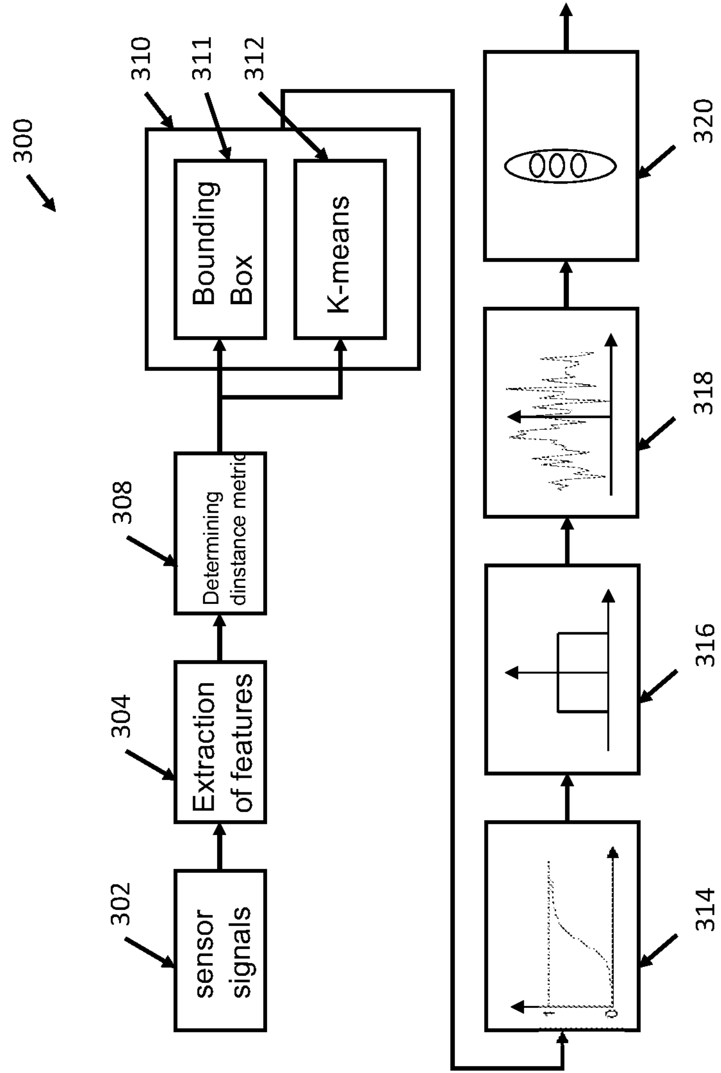
FIG. 3 shows an example of a schematic representation of a signal flow diagram of an exemplary electrical system with continuous condition monitoring.

FIG. 3 shows an example of a schematic representation of a signal flow diagram 300 including associated signal processing components of an exemplary continuous condition monitoring electrical system. In particular, a differentiator is represented in the box 310, which is arranged to determine deviations underlying the calculation of the anomaly score. The input 302 consists of the continuously recorded sensor signals. These comprise, for example, signals from the limit switches of an actuator, for example a cylinder. From these sensor signals, as represented in box 304, features are extracted by means of an extractor 304, i.e., quantities are derived that provide information about the functioning of the electrical system. In the present case, this may include actuator features such as velocity, acceleration, and/or acoustic profile.

The extracted features can be normalized to simplify their representation in an n-dimensional space. This is particularly advantageous if the features derived from the sensor data contain different physical quantities and/or magnitudes that are to be further processed together.

In box 308, as an optional step in a configuration phase, a distance metric may be determined to be applied by the differentiator 310. This may be done via a user interface.

Box 310, which represents the differentiator, determines the deviation of the extracted features from the learned features. The learned features refer to the features derived during training by normal state data. The deviation can be determined either by a bounding-box method 311 or by a k-means method 312. It is also conceivable that both methods could be used for more robust results given sufficient computational capacity.

In the bounding-box method 311 it is determined whether the extracted features lie within the space bounded by the bounding box or whether a boundary value violation is to be assumed. In the latter case, the distance between the extracted features and the bounding box is determined, otherwise the distance is "zero" (see explanation for FIG. 4*a*). In the k-means method, the distance of the features to the nearest cluster center is determined (see explanations for FIG. 4*b*).

The determined distance may be mapped to any interval (for example, from "zero" to "one") of the anomaly score by a normalization function 314. The result may be smoothed by a low-pass filter 316, and the corresponding calculated anomaly score may be provided as output by a scoring unit 318. Finally, the calculated anomaly score is output by an output unit 320.

Figure 4A:
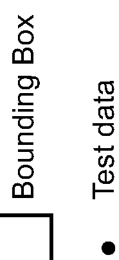
FIG. 4*a* is a schematic example of a distance determination using the bounding-box method.
Figure 4A:
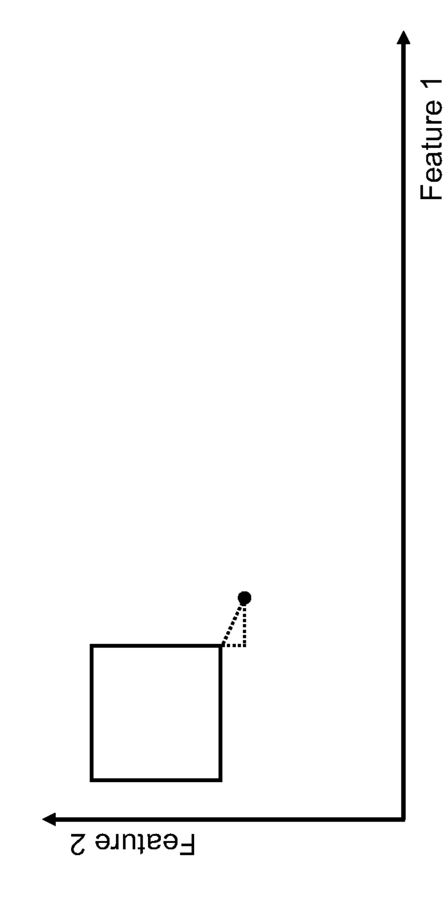
Figure 4B:
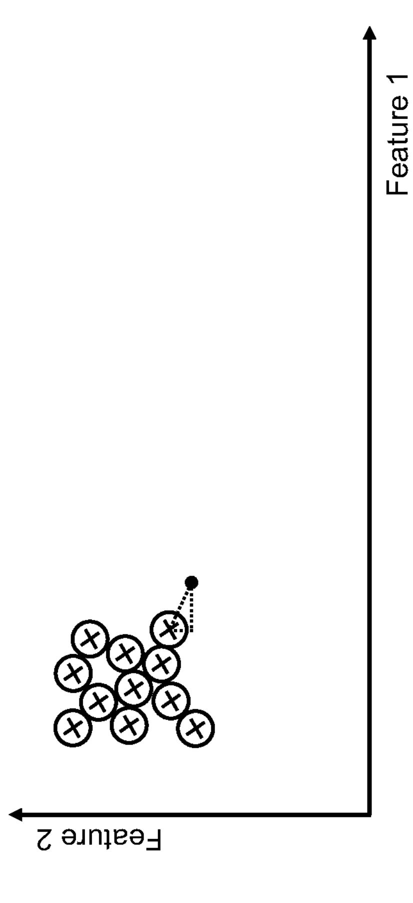
FIG. 4*b* is a schematic example of a distance determination using the k-means method.

FIG. 4*a* and FIG. 4*b* illustrate in an exemplary manner the determination of the distance of the extracted features from the normal state of the electrical system. FIG. 4*a* shows the determination of the deviation using the bounding-box method represented by reference 311 in FIG. 3. The bounding box (rectangle shown) represents the space to which the learned features of the normal state belong. If an extracted feature lies within the bounding box, then the distance is zero. If an extracted feature lies outside the bounding box, its distance from the bounding box is determined. This is shown by the dashed line. Various distance metrics, weighted distance metrics, or a combination of distance metrics can be used for this purpose. Distance metrics are for example the Euclidean norm, the maximum norm or the sum norm. The determination of the distance metric to be used can preferably be done by inputting a user selection signal on a user interface in a configuration phase, see step 308 (FIG. 3).

FIG. 4*b* shows the determination of the deviation using the k-means method represented by reference 312 in FIG. 3. The "cluster centers" represent the centers of the k-means clusters that group the learned feature data of the normal state. The grouping of the learned feature data of the normal state is illustrated by the cluster outline in FIG. 4*b*. The distance of the extracted feature ("test data") to the nearest center of the learned features is determined within the k-means method (dashed line).

Based on the distances determined by the bounding-box or k-means method, the one-class model determines an anomaly score that is output to the operator.

For FIG. 4*a* and FIG. 4*b*, it should be noted that the two-dimensional representation chosen is for illustration purposes only and that the features may be higher-dimensional (n-dimensional) objects.

Figure 5:
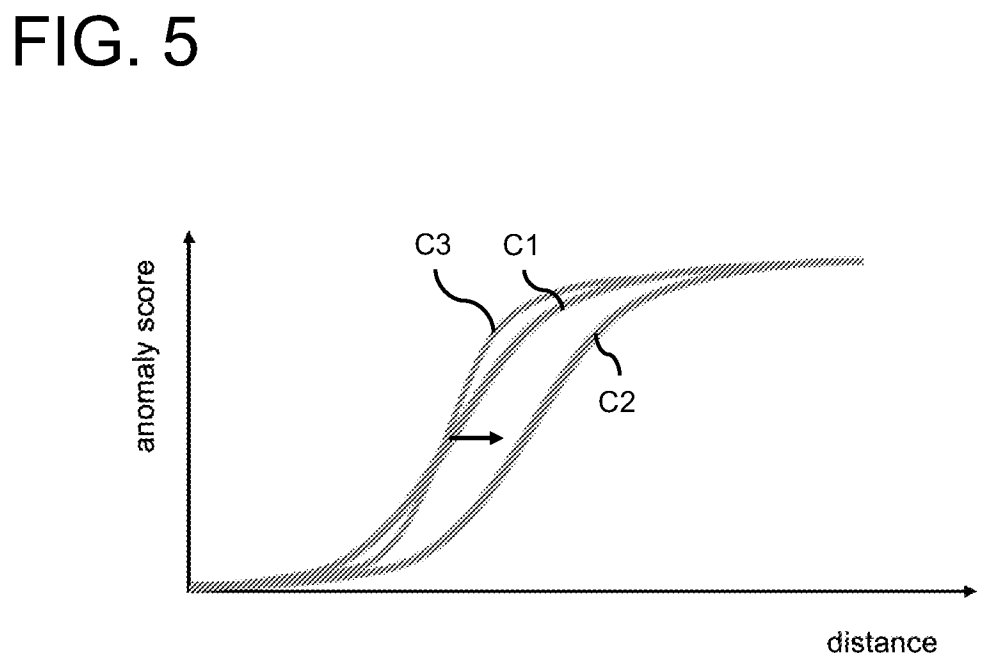

FIG. 5 is a schematic representation of a normalization function according to the present invention. The normalization function may be a sigmoid function. In the present case, the sigmoid function has been rescaled so that a distance of zero can be assigned an anomaly score of zero. The graphs C1-C3 show the influence of the parameterization of the sigmoid function on the anomaly score and how it represents the measured deviations ("distance" on the x-axis). The deviations are mapped to the anomaly score 0 . . . 1, which facilitates their interpretability and thus an appropriate reaction to possible anomalies.

In particular, the inflection point and slope of the sigmoid function are parameterized in the present case. The parameterization can be done by inputs on the user interface. Starting from the sigmoid curve C1, increasing the inflection point means a shift along the positive direction of the x-axis. This makes the model less sensitive, because higher deviations or distances are now represented by a lower anomaly score.

Furthermore, increasing the slope of the sigmoid curve C1, as exemplarily shown for curve C3, causes smaller differences in the deviations or distances to lead to larger differences in the anomaly score. Depending on the fault tolerance of the electrical system, the normalization curve can be selected and parameterized.

Finally, it should be noted that the description of the invention and the embodiments are in principle not to be understood restrictively with respect to any particular physical realization of the invention. All features explained and shown in connection with individual embodiments of the invention may be provided in different combinations in the subject matter according to the invention in order to simultaneously realize their advantageous effects.

The scope of protection of the present invention is given by the claims and is not limited by the features explained in the description or shown in the figures.

It is particularly obvious to a person skilled in the art that the invention can be applied not only to the sensor data mentioned, but also to other metrologically recorded variables which at least partly influence an operating state of the electrical system. Furthermore, the components of the condition monitoring unit can be realized distributed on several physical products.

The invention claimed is:

1. A method for continuous condition monitoring of an electrical system, comprising:

in a training phase, training a normal state model as a one-class model with normal state data representing a normal state of the electrical system, wherein a representation or modeling of the normal state is performed via: a bounding-box method, or a k-means method;

in an inference phase, continuously acquiring sensor data of the electrical system using a set of sensors, wherein the set of sensors includes at least one of: voltmeter; ammeter; temperature sensor; speed controller; a sensor for capturing a timestamp; proximity sensor that measures the position of an actuator of the electrical system; linear variable differential transformer ("LVDT") for displacement measurement of the actuator; limit position switch for detecting when the actuator reaches a certain position; microphone; and/or structure-borne sound pickup;

in a fieldbus node of a unit of the electrical system, extracting features from the acquired sensor data, wherein the unit of the electrical system includes at least one power control and a digital input/output hub, the digital input/output hub being configured to be connected to at least one actuator via a first signal line, and the power control being connected to the digital input/output hub via a second signal line and being configured to control the at least one actuator;

in the fieldbus node of the unit of the electrical system, determining deviations of extracted features from learned features of the normal state model using a distance metric;

in the fieldbus node of the unit of the electrical system, calculating an anomaly score from the determined deviations;

in the fieldbus node of the unit of the electrical system, outputting the calculated anomaly score, wherein the calculated and output anomaly score is used to detect anomalies of the electrical system and wherein the normal state data comprises at least one of: a current strength/torque of a motor, a position, velocity, and/or acceleration of an actuator, microphone/structure-borne sound measurements, force measurements, or one or more signals from one or more electrical components, wherein the one or more electrical components comprises at least one or more cylinders; and forwarding the anomaly score from the fieldbus node to selected other network participants via a TCP/IP based network protocol.

2. The method of claim 1, wherein the normal state model is a statistical model and/or a machine learning model.

3. The method according to claim 1, wherein the anomaly score is forwarded to selected other network participants via the TCP/IP-based network protocol, via one of an MQTT protocol or an OPC UA protocol.

4. The method according to claim 1, in which a productivity score is determined, when process cycles are automatically detected in order to evaluate how a cycle duration develops over a longer time horizon.

5. The method according to claim 1, in which a normalization function, comprising a sigmoid function, is applied to the determined deviations and/or wherein an inflection point and/or a slope of the sigmoid function can be parameterized and/or wherein the sigmoid function is linearly rescaled in the training phase so that a graphical representation of the anomaly score is continuous.

6. The method according to claim 1, in which the method is controlled via meta-parameters, wherein the meta-parameters comprise a parameterization of the model, comprising at least a determination of the number of k-means centers and/or a number of bounding boxes and/or a calculation rule for the boundaries of the bounding boxes, and/or a weighting of extracted features and/or further parameters for feature extraction.

7. The method according to claim 1, wherein the normal state data in the training phase and the productive data, comprising at least sensor data, in the inference phase are preprocessed using the same preprocessing methods.

8. The method according to claim 7, wherein the preprocessing methods comprise an execution of a pattern recognition algorithm on the sensor data and on the normal state data to detect recurring patterns in the sensor data representing process cycles and wherein the detected process cycles are used as parameterization of a time window and/or wherein a result of the pattern recognition algorithm is used to calculate time windows in which the feature extraction is executed.

9. The method according to claim 7, wherein the pattern recognition algorithm comprises auto-correlation.

10. The method according to claim 1, comprising a dimensionality reduction method, and wherein the dimensionality reduction method is applied to the raw data and/or to the extracted features in a data preprocessing step.

11. The method according to claim 1, wherein the calculated anomaly score is subjected to a low-pass filter, the low-pass filter being parameterizable.

12. The method according to claim 1, in which sensitivity parameters are detected on an input field of a user interface, the sensitivity parameters characterizing under which conditions comprising at least how quickly differences between the extracted features and the learned features are processed as deviations.

13. The method according to claim 1, wherein the extracted features comprise statistical characteristics and comprise mean values, minima, maxima, differences, quantiles, quartiles, skewness and/or kurtosis of the sensor data and/or their derivatives, characteristics of the frequency analysis or other selected characteristics over time.

14. The method according to claim 1, wherein the method, after acquiring the sensor data, executes a preprocessing algorithm on the acquired sensor data that transforms the data into a different format and/or filters out outlier data.

15. A condition monitoring unit for continuous condition monitoring of an electrical system for early fault detection, the condition monitoring unit being designed to carry out the method of claim 1, having:

- an interface to a memory in which a trained normal state model is stored as a one-class model that has been trained in a training phase with normal state data and represents a normal state of the electrical system;
- a data interface for continuously acquiring sensor data of the electrical system by means of a set of sensors;
- an extractor for extracting features from the acquired sensor data;
- a differentiator for determining deviations of the extracted features from learned features of the normal state model using a distance metric;
- a scoring unit for calculating an anomaly score from the determined deviations; and
- an output unit for outputting the calculated anomaly score.

16. At least one non-transitory computer readable storage medium comprising instructions which, when the instructions are executed, cause one or more processors to execute the method of claim 1.

* * * * *